United States Patent [19]
Fromwiller

[11] Patent Number: 5,965,685
[45] Date of Patent: Oct. 12, 1999

[54] RAPID CURING ALIPHATIC HOT MELT ADHESIVE

[75] Inventor: John Fromwiller, Cary, N.C.

[73] Assignee: Reichhold Chemicals, Inc., Durham, N.C.

[21] Appl. No.: 09/006,785

[22] Filed: Jan. 14, 1998

[51] Int. Cl.[6] .......................... C08G 18/14; C08G 18/18; C08G 18/20
[52] U.S. Cl. ................................ 528/48; 528/52; 528/65; 528/74.5
[58] Field of Search ................... 528/48, 52, 65, 528/74.5

[56] References Cited

U.S. PATENT DOCUMENTS

| | | | |
|---|---|---|---|
| 4,515,846 | 5/1985 | McKinney et al. | 428/95 |
| 4,524,104 | 6/1985 | Hagio et al. | 428/341 |
| 4,598,103 | 7/1986 | Chang | 521/126 |
| 4,880,846 | 11/1989 | Tuffs et al. | 521/129 |
| 4,935,453 | 6/1990 | Bock et al. | 521/113 |
| 5,558,917 | 9/1996 | Markusch et al. | 428/95 |
| 5,670,211 | 9/1997 | Huber et al. | 427/244 |

FOREIGN PATENT DOCUMENTS

0668302A1  2/1995  European Pat. Off. .

*Primary Examiner*—Nathan M. Nutter
*Attorney, Agent, or Firm*—Myers Bigel Sibley & Sajovec

[57] ABSTRACT

The present invention provides a viscosity stable, quick curing aliphatic hot melt polyurethane adhesive. The adhesive is prepared by reacting a hot melt polyurethane prepolymer comprising an unblocked aliphatic polyisocyanate and a polyol with a catalyst comprising 1,8-diazobicyclo(5,4,0)undec-7-ene or salt or blocked compound thereof.

12 Claims, No Drawings

RAPID CURING ALIPHATIC HOT MELT ADHESIVE

BACKGROUND AND FIELD OF THE INVENTION

The present invention relates to an adhesive composition, and more specifically a hot melt polyurethane adhesive composition.

There are a number of commercial laminates and materials which must be bonded together using equipment wherein rapid cure rate is critical. However, this improved cure rate cannot come at the expense of a decrease in thermal stability.

One way to improve cure rate is to utilize catalysts such as organo tin and bismuth catalysts, e.g., dibutyl tin dilaurate, dimethyl tin distearate, zinc stearate and mixtures thereof. The use of these catalysts, however, typically results in the loss of thermal and viscosity stability. An alternative is suggested in EP 0 668 302 wherein it is proposed to use a 2,2'dimorpholino-ethyl ether or di(2,6-alimethylmorpholinoethyl) ether catalyst to catalyze polyurethane reactive hot melt adhesives. Another alternative is suggested in U.S. Pat. No. 4,515,846 to McKinney et al., and relates to a carpet backing composition comprising a urethane composition, a thermoplastic composition and two catalysts. The catalysts are a conventional catalyst (e.g., dibutyl tin dilurate) and a delayed action heat activated catalyst (e.g., metal salts of dicarboxylic acids, acid salts of amines, and imidazole derivatives).

U.S. Pat. No. 4,524,104 to Hagio proposes an adhesive composition comprising an acrylic copolymer having NCO-reactive groups, a blocked polyisocyanate and a catalyst such as 1,8-diaza-bicyclo(5,4,0)undec-7-ene (DBU). The composition is useful as a pressure sensitive adhesive. There is, however, no disclosure of using an unblocked polyisocyanate.

U.S. Pat. No. 5,558,917 to Markusch et al. relates to a polyurethane carpet backing comprising polyisocyanates of less than about 2.4, an isocyanate group content of 25 to 30 percent and a urethane group content of 2 to 6 percent and comprising polymethylene poly(phenylisocyanate), from about 5 to 25 percent of 4,4'-methylene bis (phenyloisocyanate), and from about 20 to 50 percent of 2,2'- and 2,4'-methylene bis(phenyl-isocyanate).

There, however, remains a need for a catalyst that provides for rapid curing of aliphatic hot melt polyurethane compositions derived from unblocked polyisocyanates without adversely affecting thermal or viscosity stability or both.

SUMMARY OF THE INVENTION

To this end, the present invention provides a viscosity stable, quick curing aliphatic hot melt polyurethane adhesive. The adhesive is prepared by reacting a hot melt polyurethane prepolymer comprising an unblocked aliphatic polyisocyanate and a polyol with a catalyst comprising 1,8-diazobicyclo(5,4,0)undec-7-ene or salt or blocked compound thereof.

DETAILED DESCRIPTION OF THE PREFERRED EMBODIMENTS

As discussed above, a viscosity stable, quick curing hot melt polyurethane adhesive is provided by the present invention. The hot melt polyurethane adhesive comprises an unblocked aliphatic polyisocyanate and a polyol. Suitable unblocked aliphatic polyisocyanates are polyisocyanate compounds containing from about 6 to 100 carbon atoms. The term "aliphatic polyisocyanate" as used herein includes any organic polyisocyanate in which the isocyanate groups are attached to saturated carbon atoms. Preferably, the polyisocyanate compound employed contains two isocyanate groups, however, polyisocyanate compounds containing greater than two isocyanate groups are suitable for use in preparing the polyurethane resin of the invention. A mixture or a blend of more than one polyisocyanate compound may also be employed. The following aliphatic polyisocyanate compounds are exemplary suitable compounds for use in the invention: ethylene diisocyanate, 1,6-hexamethylene diisocyanate ("HDI"), 3-isocyanatomethyl-3,5,5,-trimethylcyclohexylisocyanate ("IPDI"), m-tetramethylenexylene diisocyanate ("TMXDI"), and bis (4-isocyanateocyclohexyl)methane. A particularly preferred aliphatic polyisocyanate is bis(4-isocyanateocyclohexyl) methane.

The prepolymer is formed from these blocked aliphatic polyisocyanates by condensation polymerization of the polyisocyanate with a polyol. Suitable polyols include polyether polyols, polyester polyols and the monosubstituted esters of glycerol. Polyamino-or polymercapto-containing compounds can also be included. Suitable polyether polyols include those prepared by polymerizing an alkylene oxide in the presence of a difunctional or trifunctional initiator compound. Examples of such polyols include polyethyleneoxy polyols, polypropyleneoxy polyols, polybutyleneoxy polyols, and block copolymers of ethylene oxide and propylene oxide. Preferably, the polyether polyol is a polypropyleneoxy polyol, or a block copolymer of ethylene oxide and propylene oxide, and is most preferably a polypropyleneoxy polyol or a block copolymer of ethylene oxide and propylene oxide. A particularly suitable polyether polyol is Voranol 230–238 available from The Dow Chemical Company, Midland, Mich. Suitable hydrolytically stable polyester polyols include polyesters formed from a glycol and a saturated polyfunctional dicarboxylic acid such as prepared by reacting hexanediol with dodecanedioic acid. A particularly preferred polyester polyol is Dynacoll 7380 available from HULS America, Piscataway, N.J.

Optionally, defoamers, fillers and conventional additives such as plasticizers, tackifiers, anti-oxidants, pigments, stabilizers, etc. may be included.

The components of the polyurethane polymers are combined to yield a prepolymer having an isocyanate content of from about 10 to 30 percent and an isocyanate index of 1 to 5.

The amount of catalyst used is from about 0.01 to 2 percent by weight, and preferably 0.05 to 0.15 percent by weight. The prefered catalyst is 1,8-diazabicyclo(5,4,0) undec-7-ene ("DBU") available as Polycat DBU from Air Products, Allentown, Pa. Suitable salts thereof include DBU-phenolated, DBU-2-ethylhexoate, DBU-formate, and DBU-p-toluene sulfonate.

EXAMPLE

The following are charged to a pint can under nitrogen and heated with mixing to 190 to 200° F.: 80.0 g Voranol 220-110N (polyether diol available from Dow, Midland, Mich.); 215.9 g Formrez 66-28 (hexanediol-adipic acid polyester available from Witco Chemical, Houston, Tex.); 36.0 g Dynacoll 7380 (hexanediol-dodecanedioic acid polyester available from HULS America, Piscataway, N.J.); 0.20 g BYK070 (defoamer available from BYK Chemie, Wallingford, Conn.); 2.0 Irganox 1076 (octadecyl 3,5-ditert-butyl-4-hydro hydrocinnamnate antioxidant available from Ciba-Geigy, Hawthorne, N.Y.); 1.80 DPDP antioxidant; and 0.10 g Polycat DBU. Once at temperature, 64.0 g Desmodur W bis(4-isocyanateocyclohexyl)methane available from Bayer, Pittsburgh, Pa.) is added to the can and allow to exotherm and be held at 220 to 240° F. for 3 hours. Stirring is stopped, the can is placed in a 250° F. oven for 60 minutes, and properties are checked. Typical properties are: 6000 cps@250° F., 0.5 minutes open time, and greater than 50 psi initial strength in 0.5 minute. A typical aromatic hot melt polyurethane utilizing triethylenediamine or morpholine, 4,4'-(oxydi-2,1-ethanediyl as the catalyst cures in 3–7 days; the hot melt adhesive of the present invention develops film strength in 24 hours. Moreover, viscosity of the hot melt adhesive of the present invention is stable at 250° F. over a 10 hour, 20 hour and 30 hour period wherein conventional hot melt polyurethane adhesives have the viscosity double over a 20 to 30 hour period.

That which is claimed is:

1. An adhesive composition prepared by reacting a hot melt polyurethane prepolymer comprising an unblocked aliphatic polyisocyanate and a polyol with a catalyst consisting essentially of 1,8-diazabicyclo(5,4,0)undec-7-ene or salt thereof.

2. The adhesive composition of claim 1 wherein the aliphatic polyisocyanate is selected from the group consisting of ethylene diisocyanate, 1,6-hexamethylene diisocyanate, 3-isocyanatomethyl-3,5,5,-trimethylcyclohexylisocyanate, m-tetramethylenexylene diisocyanate, and bis(4-isocyanateocyclohexyl)methane.

3. The adhesive composition of claim 1 wherein the polyol is selected from the group consisting of polyether polyols and polyester polyols.

4. The adhesive composition of claim 3 wherein the polyether polyol is selected from the group consisting of polyethyleneoxy polyols, polypropyleneoxy polyols, polybutyleneoxy polyols, and block copolymers of ethylene oxide and propylene oxide.

5. The adhesive composition of claim 3 wherein the polyester polyol is formed from a glycol and a saturated polyfunctional dicarboxylic acid.

6. The adhesive composition of claim 5 wherein the glycol is hexanediol and the dicarboxylic acid is dodecanedioic acid.

7. A reactive unblocked aliphatic hot melt polyurethane catalyzed using a catalyst consisting essentially of 1,8-diazabicyclo(5,4,0)undec-7-ene or salt thereof and having a viscosity stability of less than about 2 percent gain per hour at 250° F. and a cure rate of less than about 3 days.

8. The reactive unblocked aliphatic hot melt of claim 7 wherein the aliphatic polyisocyanate is selected from the group consisting of ethylene diisocyanate, 1,6-hexamethylene diisocyanate, 3-isocyanatomethyl-3,5,5,-trimethylcyclohexylisocyanate, m-tetramethylenexylene diisocyanate, and bis(4-isocyanateocyclohexyl)methane.

9. The reactive unblocked aliphatic hot melt of claim 7 wherein the polyol is selected from the group consisting of polyether polyols and polyester polyols.

10. The reactive unblocked aliphatic hot melt of claim 9 wherein the polyether polyol is selected from the group consisting of polyethyleneoxy polyols, polypropyleneoxy polyols, polybutyleneoxy polyols, and block copolymers of ethylene oxide and propylene oxide.

11. The reactive unblocked aliphatic hot melt of claim 9 wherein the polyester polyol is formed from a glycol and a saturated polyfunctional dicarboxylic acid.

12. The reactive unblocked aliphatic hot melt of claim 11 wherein the glycol is hexanediol and the dicarboxylic acid is dodecanedioic acid.

* * * * *